United States Patent
Schroeder

(10) Patent No.: US 8,746,798 B2
(45) Date of Patent: Jun. 10, 2014

(54) RETRACTABLE HEADREST

(75) Inventor: Timo Schroeder, Ebersberg (DE)

(73) Assignee: Lear Corporation, Southfield, MI (US)

( * ) Notice: Subject to any disclaimer, the term of this patent is extended or adjusted under 35 U.S.C. 154(b) by 135 days.

(21) Appl. No.: 13/348,972

(22) Filed: Jan. 12, 2012

(65) Prior Publication Data

US 2012/0212025 A1 Aug. 23, 2012

(30) Foreign Application Priority Data

Feb. 18, 2011 (DE) .......................... 10 2011 004 396

(51) Int. Cl.
*B60N 2/48* (2006.01)

(52) U.S. Cl.
CPC ............ *B60N 2/4832* (2013.01); *B60N 2/4811* (2013.01); *B60N 2/487* (2013.01)
USPC ..................................... 297/391; 297/112

(58) Field of Classification Search
CPC .... B60N 2/487; B60N 2/4841; B60N 2/4811; B60N 2/4832; B60N 2/4864
USPC .......... 297/403, 410, 409, 112, 404, 238, 391
See application file for complete search history.

(56) References Cited

U.S. PATENT DOCUMENTS

| | | | | |
|---|---|---|---|---|
| 1,714,696 | A | * | 5/1929 | Samuelian ..................... 297/112 |
| 2,466,553 | A | * | 4/1949 | McDonald, Jr. .............. 297/404 |
| 3,159,427 | A | * | 12/1964 | Lawson ......................... 297/410 |
| 3,477,761 | A | * | 11/1969 | Krantz .......................... 297/409 |
| 4,935,680 | A | | 6/1990 | Sugiyama |
| 4,977,973 | A | | 12/1990 | Takizawa |
| 6,279,996 | B1 | | 8/2001 | Albrecht |
| 7,458,640 | B1 | * | 12/2008 | Hill .............................. 297/410 |
| 7,484,808 | B2 | | 2/2009 | Yetukuri et al. |
| 8,128,162 | B2 | * | 3/2012 | Gerhardt et al. ............... 297/61 |
| 2002/0043860 | A1 | * | 4/2002 | Dinkel et al. ................ 297/410 |
| 2003/0015898 | A1 | | 1/2003 | Breed |
| 2009/0167064 | A1 | | 7/2009 | Yoshizawa |

FOREIGN PATENT DOCUMENTS

| | | |
|---|---|---|
| DE | 4227697 A1 | 2/1994 |
| DE | 69602992 T2 | 1/2000 |
| DE | 19850754 A1 | 5/2000 |
| DE | 69800787 T2 | 10/2001 |
| DE | 10038813 A1 | 2/2002 |
| DE | 69811672 T2 | 11/2003 |
| WO | 9909862 A1 | 3/1999 |

OTHER PUBLICATIONS

German Search Report Dated Dec. 22, 2011, Applicant Lear Seating Corp., Application No. 10 2011 004 396.9.
U.S. Appl. No. 13/101,201—19 Pages, filed May 5, 2011.

* cited by examiner

*Primary Examiner* — Milton Nelson, Jr.
(74) *Attorney, Agent, or Firm* — Brooks Kushman P.C.

(57) ABSTRACT

A vehicle seat assembly includes a support structure and a headrest supported by the support structure. The headrest includes a headrest body that is movable with respect to the support structure between a stowed position and a use position, and a locking mechanism for locking the headrest body in the use position. When the headrest body is in the use position, the locking mechanism is releasable to allow the headrest body to rotate rearwardly and slide downwardly to the stowed position.

20 Claims, 5 Drawing Sheets

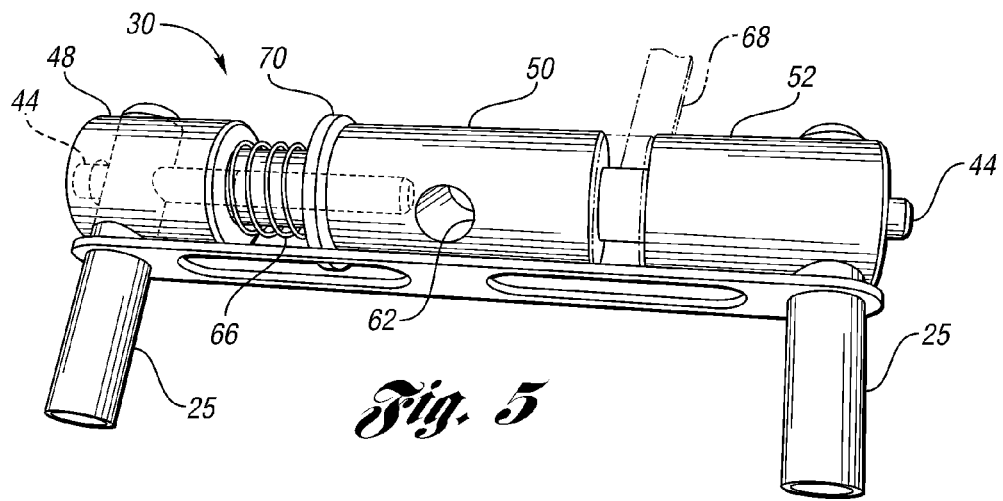
Fig. 5
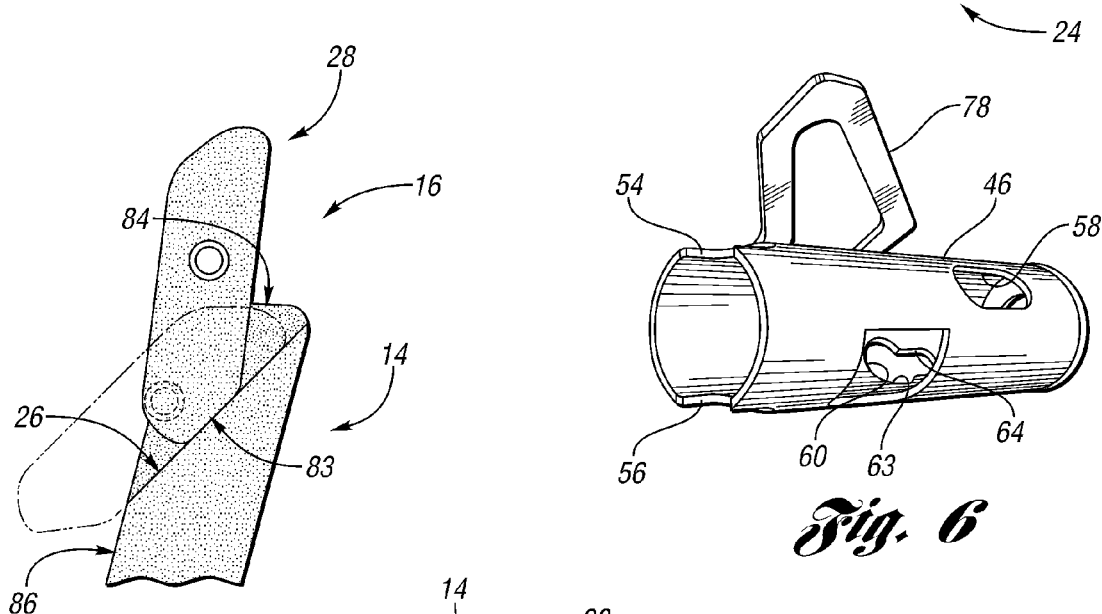
Fig. 6
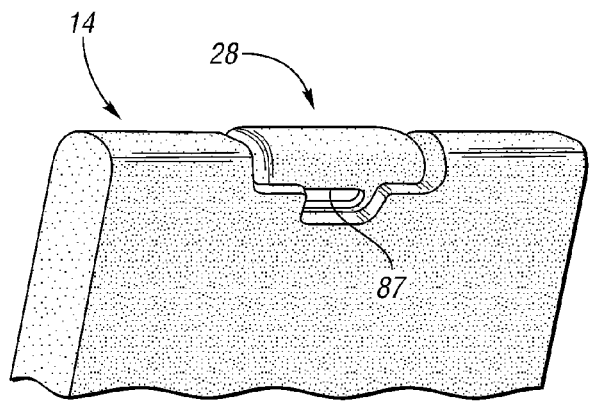
Fig. 7
Fig. 8

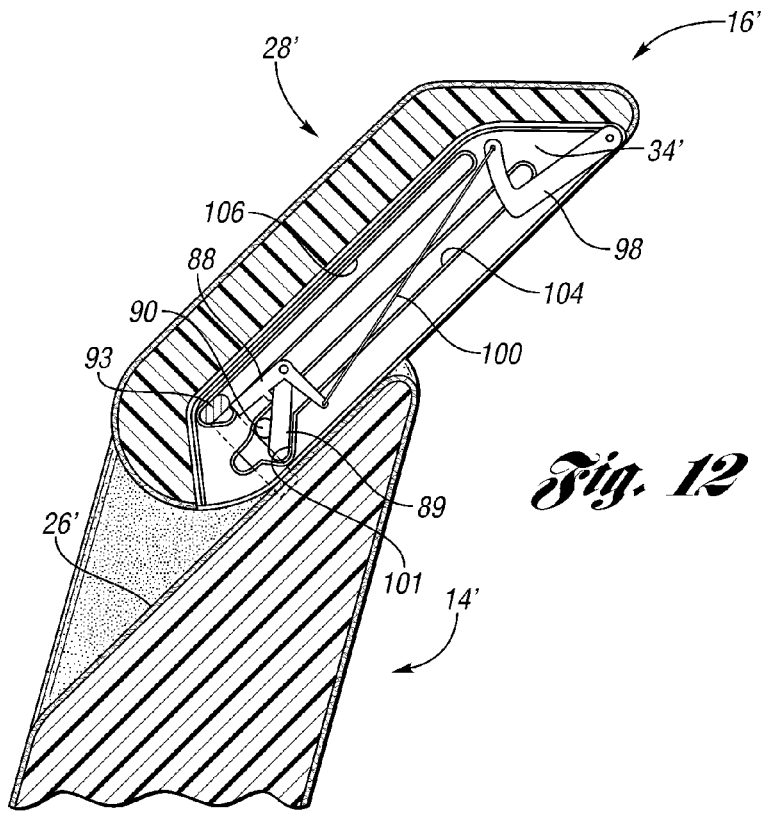
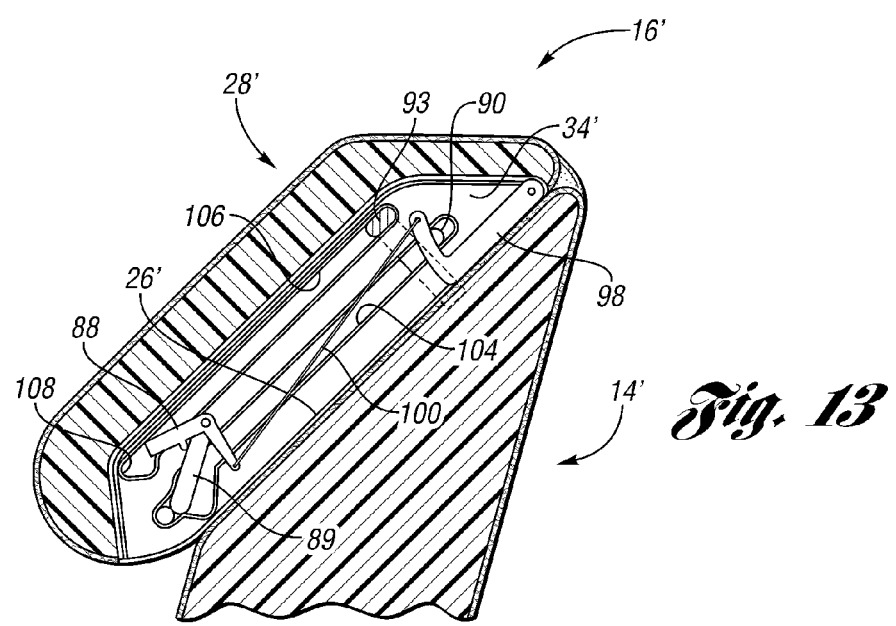

RETRACTABLE HEADREST

CROSS-REFERENCE TO RELATED APPLICATIONS

This application claims foreign priority benefits under 35 U.S.C. §119(a)-(d) to DE 10 2011 004 396.9, filed Feb. 18, 2011, which is hereby incorporated by reference in its entirety.

TECHNICAL FIELD

The disclosure relates to a retractable headrest for use with a vehicle seat.

BACKGROUND

A vehicle seat assembly may be provided with a movable headrest. Examples of movable headrests are disclosed in U.S. Pat. Nos. 4,935,680 and 6,279,996.

SUMMARY

A vehicle seat assembly according to and embodiment of the present disclosure includes a support structure and a headrest supported by the support structure. The headrest includes a headrest body that is movable with respect to the support structure between a stowed position and a use position, and a locking mechanism for locking the headrest body in the use position. When the headrest body is in the use position, the locking mechanism is releasable to allow the headrest body to rotate rearwardly to a release position, and wherein the headrest body is further movable downwardly from the release position to the stowed position.

While exemplary embodiments are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 5 is a perspective view of the locking mechanism, with the locking tube removed to show a portion of the locking mechanism underneath the locking tube;

FIG. 6 is a perspective view of a locking tube of the locking mechanism;

FIG. 7 is a side view of the seat back and headrest showing the headrest body in solid lines in the use position, and in phantom lines in the stowed position;

FIG. 8 is a rear view of a portion of the headrest and seat back;

FIG. 12 is a cross-sectional side view of the headrest viewed in the same direction as FIG. 10 and showing the headrest body in an intermediate position; and FIG. 13 is a cross-sectional side view of the headrest showing the headrest viewed in the same direction as FIG. 10 and showing the headrest body in a stowed position.

DETAILED DESCRIPTION

The present disclosure describes various vehicle seat configurations that include a retractable headrest. Several specific embodiments are set forth in the following description and in FIGS. 1-13 to provide a thorough understanding of certain embodiments according to the present disclosure. As those of ordinary skill in the art will understand, one or more features of an embodiment illustrated and described with reference to any one of the Figures may be combined with features illustrated in one or more other Figures to produce embodiments that are not explicitly illustrated or described. In addition, other embodiments may be practiced without one or more of the specific features explained in the following description.

Figure 1:
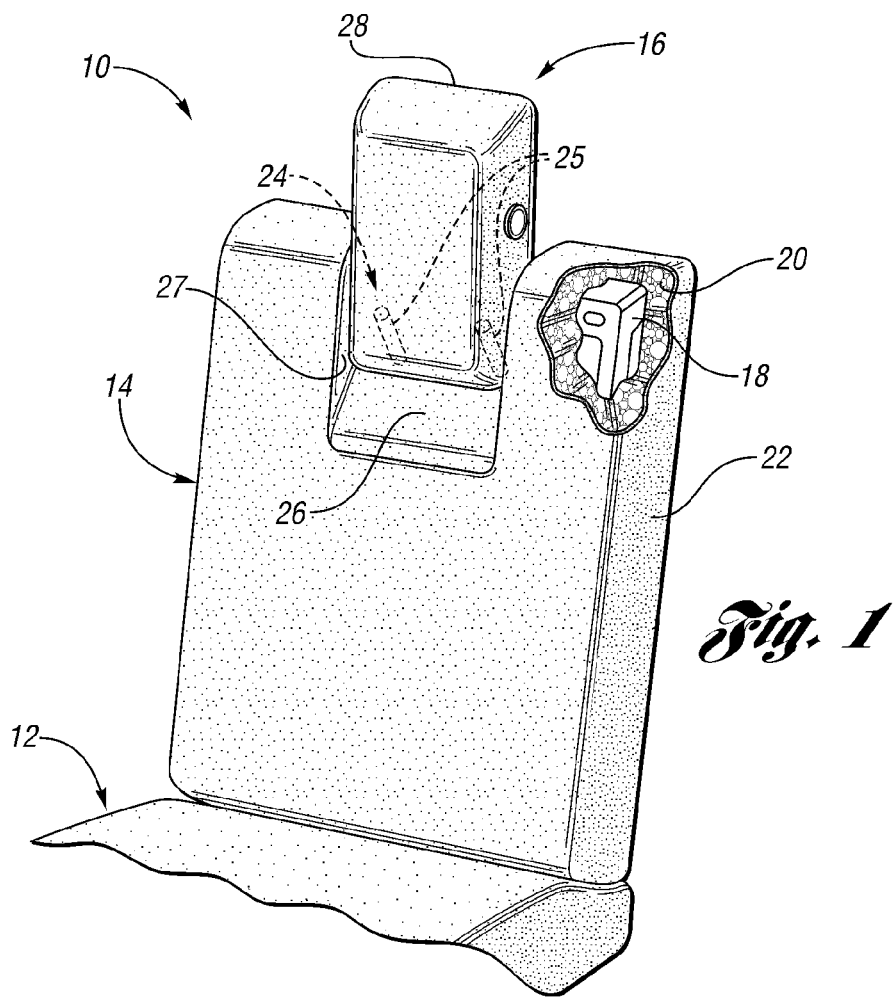
FIG. 1 is a perspective view of a seat assembly according to the present disclosure and including a seat back and a headrest mounted on the seat back, the headrest including a headrest body shown in a use position.

FIG. 1 shows a vehicle seat assembly 10 according to the present disclosure for use in a motor vehicle. The seat assembly 10 includes a seat bottom cushion assembly or seat bottom 12 adapted to be mounted on a floor or other support structure of the vehicle, a seat back cushion assembly or seat back 14 pivotally attached to the seat bottom 12, and a headrest 16 movably mounted on the seat back 14. As another example, the seat back 14 may be mounted directly to the floor or other support structure of the vehicle.

The seat bottom 12 and seat back 14 may each include a support structure, such as a frame 18, a cushion portion or member 20 supported by the frame 18, and a trim cover 22 that covers the cushion member 20 and frame 18. The seat back 14 further includes additional support structure 24 attached to the frame 18 and extending from an angled upper surface 26 of the trim cover 22. For example, the support structure 24 may include one or more support members, such as headrest support rods 25.

Figure 2:
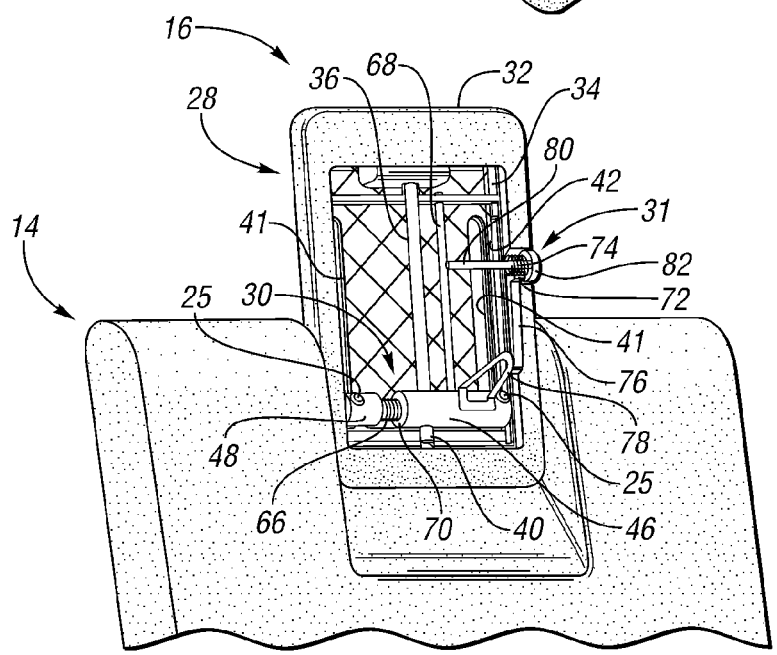
FIG. 2 is a perspective view of the seat back and the headrest, with a portion of the headrest body removed to show a locking mechanism and a release mechanism of the headrest, wherein the locking mechanism includes a locking tube that is engageable with a support structure of the seat back.

Referring to FIGS. 1 and 2, the headrest 16 is mounted on the support rods 25 and may be received in a recess 27 formed in the seat back 14. As another example, the seat back 14 may be provided without a recess 27, and the entire headrest 16, or a substantial portion of the headrest 16, may be positioned above a top surface of the seat back 14.

In the illustrated embodiment, the headrest 16 includes a headrest body 28, a locking mechanism 30 and a release mechanism 31 for releasing the locking mechanism 30. The headrest body 28 is movable with respect to the support rods 25 from a use position shown in FIGS. 1 and 2 to an intermediate or release position shown in FIG. 3, and then to a stowed position shown in FIG. 4. As explained below in detail, the locking mechanism 30 is configured to lock the headrest body 28 in the use position.

Figure 3:
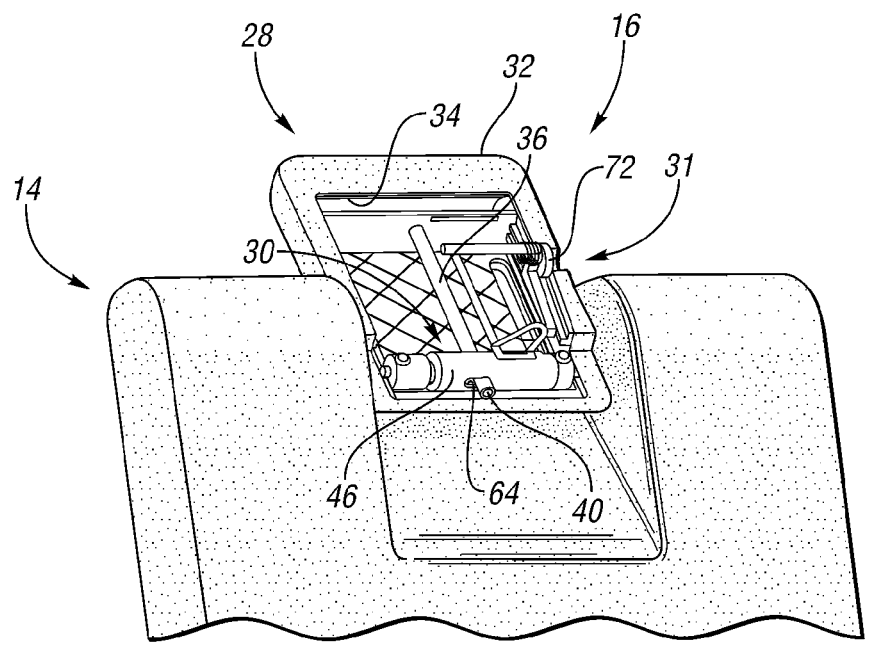
FIG. 3 is a perspective view similar to FIG. 2 showing the headrest body in an intermediate position.
Figure 4:
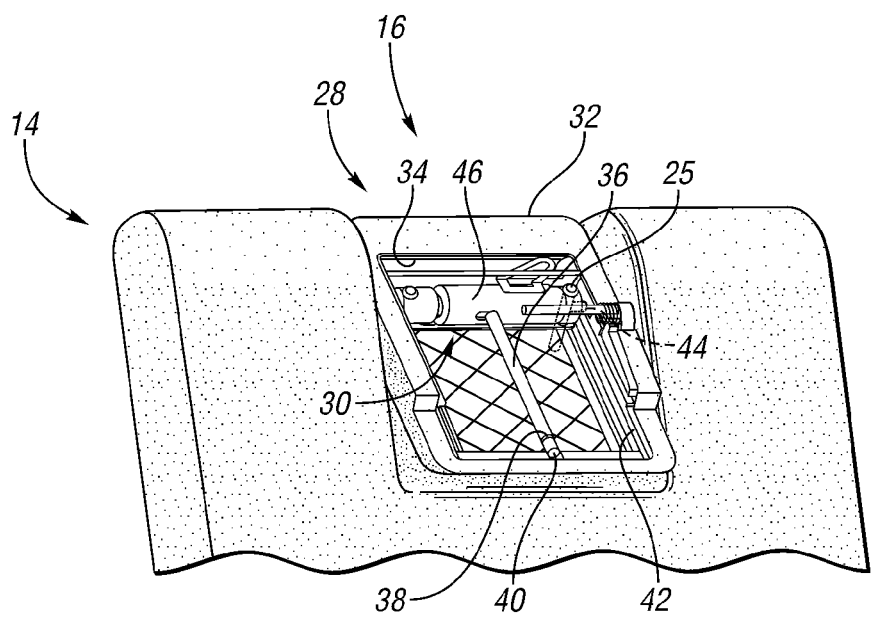
FIG. 4 is a perspective view similar to FIG. 2 showing the headrest body in a stowed position.

In the embodiment shown in FIGS. 2-4, the headrest body 28 includes a cushion member 32 supported by a support member 34, such as a substrate or back plate, and a guide member 36, such as a guide rod, attached to the support member 34. The guide member 36 has a circumferential groove 38 disposed proximate a lower end 40. The support member 34 also has guide slots 41 that receive the support rods 25, and guide channels 42 disposed on opposite sides for receiving guide members, such as guide pins 44, which are attached to the support rods 25.

The guide slots 41 and guide channels 42 may cooperate with the support rods 25 and the guide pins 44, respectively, to guide movement of the headrest body 28 between the intermediate position shown in FIG. 3 and the stowed position shown in FIG. 4. The guide pins 44 may also serve as pivot points when the headrest body 28 rotates between the use position shown in FIG. 2 and the intermediate position shown in FIG. 3.

In addition, the guide slots 41 and/or guide channels 42 may cooperate with the support rods 25 and/or the guide pins 44, respectively, to inhibit twisting or distortion of the headrest body 28. Alternatively or supplementally, the headrest body 28 may include two spaced apart guide members 36 that cooperate with the locking mechanism 30 to inhibit twisting or distortion of the headrest body 28.

The locking mechanism 30 includes a locking member, such as a locking tube 46, movably supported on the support rods 25. For example, referring to FIG. 5, the locking tube 46 may be supported on or by one or more support members, such as first, second and third cylindrical supports 48, 50 and 52, respectively, that are attached to or otherwise supported by the support rods 25. In the embodiment shown in FIG. 5, the first and third supports 48 and 52, respectively, are fixedly attached to the support rods 25 by the guide pins 44, and the second support 50 is rotatably supported by the first and third supports 48 and 52, respectively, and/or the guide pins 44. The locking tube 46 rests on the second and third supports 50 and 52, respectively, and is rotatable with the second support 50.

The locking tube 46 is also laterally movable with respect to the supports 48, 50 and 52 between an engaged position (shown in FIG. 2), in which the locking tube 46 is engaged with the support structure 24, and a disengaged position (shown in FIG. 3), in which the locking tube 46 is disengaged from the support structure 24. Referring to FIG. 6, the locking tube 46 has one or more lock features, such as first and second notches 54 and 56, respectively, that are engaged with the support structure 24 when the locking tube 46 is in the engaged position. With this configuration, the locking tube 46 inhibits or prevents the headrest body 28 from rotating when the notches 54 and 56 are engaged with the support structure 24. When the notches 54 and 56 are disengaged from the support structure 24, however, the headrest body 28 and locking tube 46 are rotatable with respect to the support structure 24.

In addition, the locking tube 46 has first and second openings 58 and 60, respectively, that receive the guide member 36. The guide member 36 is also slidably received in a cylindrical opening 62 (shown in FIG. 5) formed in the second support 50.

The second opening 60 formed in the locking tube 46 has a wide portion 63 and a narrow portion 64 having a smaller width than the wide portion 63. When the locking tube 46 is in the disengaged position, the wide portion 63 of the second opening 60 is aligned with the guide member 36, and the headrest body 28 may be moved, such as translated or slid, upwardly and downwardly with respect to the locking tube 46. When the locking tube 46 is in the engaged position, the narrow portion 64 is engaged with the groove 38 formed on the guide member 36, such that the headrest body 28 is inhibited or prevented from moving upwardly or downwardly.

If the headrest body 28 is provided with an additional guide member 36, the locking tube 46 and the second support 50, or other support 48, 52, may be provided with additional openings to receive the additional guide member 36.

Referring to FIGS. 2-5, the locking mechanism 30 also includes first and second biasing members 66 and 68, respectively. The first biasing member 66 is configured to bias an upper portion of the headrest body 28 rearwardly, and the second spring member 68 is configured to bias the headrest body 28 downwardly.

The first biasing member 66 may be a spring member, such as a torsion spring, having a main body positioned about an end of the second support 50 and one of the guide members 44. In the embodiment shown in FIG. 5, the first biasing member 66 has a first end attached to or otherwise operatively associated with the first support 48, and a second end attached to or otherwise associated with the second support 50. The first biasing member 66 urges the second support 50 and headrest body 28 to rotate rearwardly about an axis that extends through the guide members 44.

The first biasing member 66 also biases the locking tube 46 away from the first support 48. In that regard, a portion of the first biasing member 66 is engaged with a spacer member, such as ring 70, that is engaged with the locking tube 46. Movement of the ring 70 away from the first support 48 causes the locking tube 46 to move as well.

The second biasing member 68 may also be a spring member, such as a roll spring, spiral spring or tape spring. In the embodiment shown in FIGS. 2 and 5, the second biasing member 68 has a main body positioned about an end of the second support 50, a first end attached to or otherwise operatively associated with the second support 50 and/or third support 52, and a second end attached to or otherwise associated with the support member 34 of the headrest body 28. When the headrest body 28 is in the use position, the second biasing member 68 is in an extended position, and urges the headrest body 28 downwardly.

Referring to FIGS. 2 and 3, the release mechanism 31 includes a release member 72 that is movable between an inactive position (shown in FIG. 2) and a release position (shown in FIG. 3), and a biasing member, such as a coil spring 74, that biases the release member 72 toward the inactive position. When the release member 72 is moved toward the release position, an engaging portion 76 of the release member 72 engages an engaging portion 78, such as a tab or lever, of the locking tube 46, and the release member 72 moves the locking tube 46 from the engaged position to the disengaged position. In the embodiment shown in FIGS. 2 and 3, the release member 72 has a generally L-shaped body that includes the engaging portion 76, a guide portion 80 and a button portion 82 that may be pushed by a seat user or operator to move the release member 72 to the release position. The guide portion 80 and/or button portion 82 may be received in a channel or slot formed in the cushion member 32 and/or support member 34 of the headrest body 28, such that the release member 72 may be guided between the inactive and release positions.

Referring to FIGS. 1 through 7, operation of the headrest 16 will now be described in more detail. When a seat user or operator desires to move the headrest body 28 from the use position shown in FIGS. 1 and 2 to the stowed position shown in FIG. 4, the seat operator may push the release member 72 to cause the locking tube 46 to disengage the support structure 24, and to further cause the locking tube 46 to disengage the groove 38. The first biasing member 66 then causes the headrest body 28 to rotate from the use position to the intermediate position shown in FIG. 3. Referring to FIG. 7, the headrest body 28 may be provided with a gripping surface, such as an angled surface 83, that cooperates with the angled upper surface 26 of the seat back 14 to hold the headrest body 28 in a raised position until the headrest body 28 has rotated to the intermediate position.

When the headrest body 28 reaches the intermediate position, or prior to such position, the second biasing member 68 causes the headrest body 28 to move downwardly to the stowed position shown in FIG. 4. For example, the headrest body 28 may slide downwardly along the angled upper surface 26 of the seat back 14 from the intermediate position to the stowed position. In the stowed position, shown in phantom in FIG. 7, a top portion of the headrest body 28 may be generally flush with or below a top surface 84 of the seat back 14 to maximize rearward visibility, and a bottom portion of the headrest body 28 may protrude forward of a front surface 86 of the seat back 14 to inhibit use of the seat by a seat occupant.

Referring to FIG. 8, when the seat user desires to move the headrest body 28 back to the use position, the user may grasp a handle 87 formed in the back portion of the headrest body 28 and pull the headrest body 28 from the stowed position to the intermediate position. When the headrest body 28 is at or near the intermediate position, the headrest body 28 may then be rotated forwardly to the use position. When the headrest body 28 reaches the use position, the locking tube 46 is urged back to the engaged position by the first biasing member 66, such that the locking tube 46 engages the groove 38 in the guide rod 36 and the support structure 24.

With the above configuration, the headrest body 28 may be moved to the stowed position to maximize rearward visibility. Furthermore, because the headrest body 28 may protrude forward of the seat back 14 when in the stowed position, use of the seat assembly 10 may be inhibited when the headrest body 28 is in the stowed position.

FIG. 9-13 show another embodiment 10' of a seat assembly according to the present disclosure. The seat assembly 10' includes similar components as the seat assembly 10, and those similar components are identified with similar reference numbers. The seat assembly 10', however, includes another embodiment 16' of a headrest according to the present disclosure.

Figure 9:
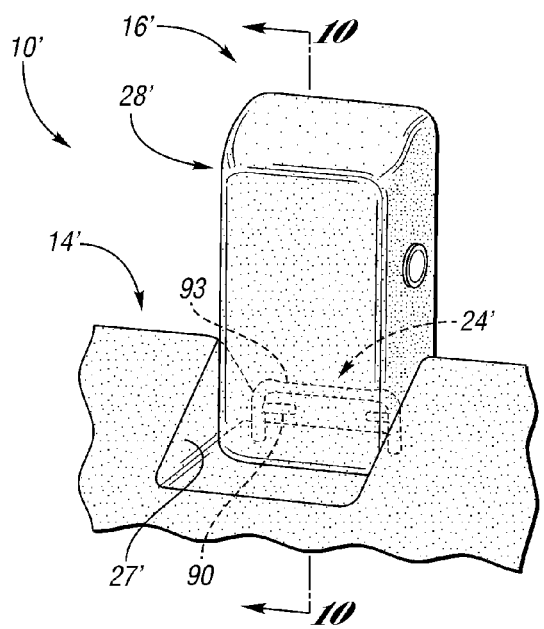
FIG. 9 is a perspective view of another embodiment of a seat assembly according to the present disclosure and including a seat back and a headrest mounted on the seat back, the headrest including a headrest body shown in a use position.
Figure 10:
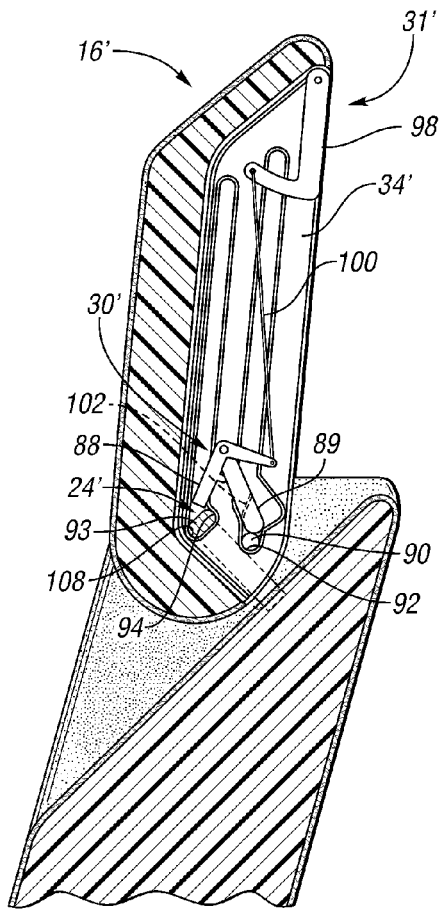
FIG. 10 is a cross-sectional view of the headrest of FIG. 9 showing a locking mechanism and release mechanism of the headrest.

Referring to FIGS. 9 and 10, the headrest 16' is mounted on support structure 24' of seat back 14' and is received in a recess 27' formed in the seat back 14'. The headrest 16' includes a headrest body 28', a locking mechanism 30' and a release mechanism 31' for releasing the locking mechanism 30'. The headrest body 28' is movable with respect to the support structure 24' between a use position, shown in FIGS. 9 and 10, and a stowed position, in a similar manner as described above with respect to the headrest body 28'. As explained below in detail, the locking mechanism 30' is configured to lock the headrest body 28' in the use position.

The locking mechanism 30' includes first and second rotatable levers 88 and 89 that are pivotally attached to the support member 34', such as with a pivot pin, and the levers 88 and 89 cooperate to lock the headrest body 28' in the use position. In that regard, when the headrest body 28' is in the use position, the first and second levers 88 and 89 are in respective locking positions. In those positions, the second lever 89 is engaged with the first lever 88 and a laterally extending lower portion 90 of the support structure 24', which portion 90 is received in a first recess or notch 92 formed in a support member 34' of the headrest body 28'. Furthermore, a laterally extending upper portion 93 of the support structure 24' is received in a second recess or notch 94. As shown in FIG. 10, the upper portion 93 may have an oblong shaped cross-section, such as a cartouche cross-section, with a flat surface that is engageable with a flat surface of the notch 94.

Figure 11:
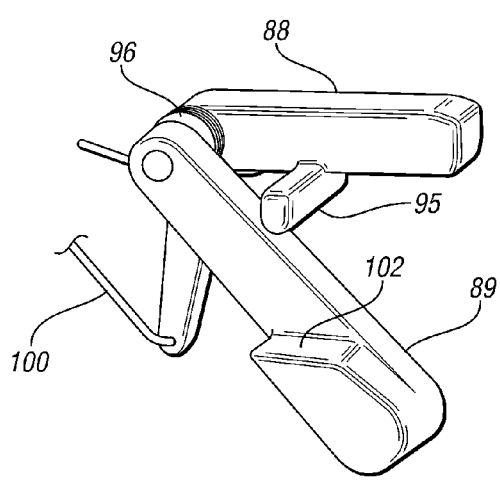
FIG. 11 is a perspective view of levers of the locking mechanism of FIG. 10, viewed from an opposite side of the levers as compared to FIG. 10.

Referring to FIGS. 10 and 11, the first lever 88 includes an engaging portion, such as a projection 95, that is engageable with an engaging portion on the second lever 89, such that rotation of the first lever 88 in a first direction (e.g., counter-clockwise in the embodiment shown in FIG. 10) causes the second lever 89 to rotate. The locking mechanism 30' further includes one or more biasing members that urge the levers 88 and 89 to rotate. For example, the locking mechanism 30' may include a torsion spring 96 that urges the levers 88 and 89 to rotate in a second direction opposite the first direction. The torsion spring 96 may have first and second ends engaged with the first and second levers 88 and 89, respectively, and a middle portion engaged with the support member 34'.

The release mechanism 31' further includes a release member 98, such as a pivotable lever or button pivotally attached to the support member 34', and a connector member 100, such as a link or a wire, that connects the release member 98 to the first lever 88. When the headrest body 28' is in the use position shown in FIG. 10, and the release member 98 is actuated, such as by pushing the release member 98 inwardly with respect to the headrest body 28', the release member 98 causes the first and second levers 88 and 89, respectively, to rotate in the first direction toward respective release positions. As a result, the second lever 89 disengages the lower portion 90 of the support structure 24' and moves into a third notch or recess 101 formed in the support member 34', such that the headrest body 28' may be rotated backward from the use position to an intermediate position shown in FIG. 12.

With the levers 88 and 89 in their respective release positions, the headrest body 28 may also be moved or slid downwardly to the stowed position shown in FIG. 13. To facilitate such movement, the second lever 89 has a notch or recess 102 that receives the lower portion 90 of the support structure 24', such that an upper portion of the headrest body 28' is permitted to move past the lower portion 90. Furthermore, the lower portion 90 and upper portion 93 of the support structure 24' slide along first and second guide channels or grooves 104 and 106, respectively, that are formed in the support member 34', such that the headrest body 28' is inhibited from rotating as the headrest body 28' moves from the intermediate position to the stowed position. Once a lower portion of the first lever 88 has moved sufficiently below the upper portion 93 of the support structure 24', the release member 98 no longer needs to be actuated by the seat user.

The headrest 16' may also include one or more biasing members that urge the headrest body 28' to rotate rearwardly with respect to the support structure 24', and further urge the headrest body 28' downwardly with respect to the support structure 24' to facilitate movement of the headrest body 28' from the use position to the stowed position. For example, the headrest 16' may include a torsion spring that urges the headrest body 28' rearwardly when the release member 98 has been actuated, and a roll spring, spiral spring or tape spring that urges the headrest body 28' downwardly.

When a seat operator or user desires to move the headrest body 28' from the stowed position back to the use position, the user may pull the headrest body 28' diagonally upwardly along the angled surface 26' of the seat back 14', such that the lower and upper portions 90 and 93 of the support structure 24' slide along the guide grooves 104 and 106, respectively. As the headrest body 28' approaches the intermediate position shown in FIG. 12, the upper portion 93 engages the first lever 88 and causes the first lever 88 to rotate toward its release position, which in turn causes the second lever 89 to rotate toward its release position. The headrest body 28' may then be moved further upwardly to the intermediate position, in which the upper portion 93 of the support structure 24' is engaged with an end stop 108 formed in the support member 34'. When the first lever 88 is moved beyond the upper portion 93, the torsion spring 96 moves the first lever 88 to its locking position, in which the first lever 88 inhibits the headrest body 28' from moving downwardly. The torsion spring 96 also urges the second lever 89 toward its locking position until the second lever 89 engages the lower portion 90 of the support structure 24'.

The headrest body 28' may then be rotated forwardly toward the use position until the upper portion 93 of the support structure 24' engages the second notch 94. As the headrest body 28' is rotated forwardly, the second lever 89 is rotated to its locking position by the torsion spring 96 when the second lever 89 is raised above the lower portion 90 of the support structure 24'.

With the above configuration, it is not necessary to actuate the release mechanism 31' in order to move the headrest body 28' from the stowed position to the use position. Furthermore, the headrest body 28' may be provided with a handle or other gripping portion that may be gripped by a seat user to facilitate movement of the headrest body 28' from the stowed position to the use position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
   a support structure;
   a headrest supported by the support structure, the headrest including a headrest body that is movable with respect to the support structure between a stowed position and a use position, and a locking mechanism for locking the headrest body in the use position, wherein when the headrest body is in the use position, the locking mechanism is releasable to allow the headrest body to rotate rearwardly to a release position, and wherein the headrest body is further movable downwardly from the release position to the stowed position; and
   a spring member for urging the headrest body downwardly from the release position to the stowed position.

2. The vehicle seat assembly of claim 1 wherein the locking mechanism includes a locking member that is engageable with the support structure to hold the headrest body in the use position.

3. The vehicle seat assembly of claim 2 wherein the headrest body includes a guide member having a groove, and the locking member is engageable with the groove to assist in holding the headrest body in the use position.

4. The vehicle seat assembly of claim 2 wherein the locking mechanism includes a release member for disengaging the locking member from the support structure to allow the headrest body to rotate rearwardly from the use position to the release position.

5. The vehicle seat assembly of claim 1 further comprising a spring member associated with the headrest body for urging the headrest body rearwardly.

6. The vehicle seat assembly of claim 1 wherein the headrest body includes first and second guide grooves, and the support structure includes first and second laterally extending portions that are receivable in the first and second guide grooves respectively, and the portions cooperate with the grooves to guide movement of the headrest body toward the stowed position.

7. The vehicle seat assembly of claim 1 wherein the locking mechanism includes a rotatable lever that is engageable with the support structure when the headrest body is in the use position.

8. The vehicle seat assembly of claim 1 wherein the locking mechanism includes first and second rotatable levers that cooperate to lock the headrest body in the use position, wherein the first lever is rotatable with respect to the second lever.

9. The vehicle seat assembly of claim 8 wherein the locking mechanism further includes a release member connected to the first lever for rotating the first lever, and wherein the first lever is engageable with the second lever such that sufficient rotation of the first lever causes the second lever to rotate.

10. The vehicle seat assembly of claim 1 further comprising a seat back that includes the support structure, the seat back further including a cushion portion, wherein the headrest body has an angled lower surface that is engageable with the cushion portion to assist in holding the headrest body in a raised position until the headrest body is rotated from the use position to the release position.

11. The vehicle seat assembly of claim 1 further comprising a seat back that includes the support structure, the seat back further including a cushion portion having a front surface, wherein the headrest body protrudes forwardly beyond the front surface of the cushion portion when the headrest body is in the stowed position.

12. The vehicle seat assembly of claim 1 further comprising a seat back that includes the support structure, the seat back further including a cushion portion having a top surface, wherein the headrest body does not extend above the top surface when the headrest body is in the stowed position.

13. A vehicle seat assembly comprising:
    a seat back including a support structure and a cushion portion having a front surface; and
    a headrest supported by the support structure, the headrest including a headrest body that is movable with respect to the support structure between a stowed position, in which the headrest body protrudes forwardly beyond the front surface of the cushion portion, and a use position, and a locking mechanism for locking the headrest body in the use position, wherein when the headrest body is in the use position, the locking mechanism is releasable to allow the headrest body to rotate rearwardly to a release position, and wherein the headrest body is further movable downwardly from the release position to the stowed position.

14. A vehicle seat assembly comprising:
    a seat back including a cushion portion having an upper surface, and a support member extending from the upper surface; and
    a headrest supported by the support member and including a headrest body and a locking mechanism, the headrest body being movable with respect to the support member between a stowed position and a use position and including a guide member having a groove, the locking mechanism including a locking tube that is engageable with the support member and the groove of the guide member to lock the headrest body in the use position;

wherein when the headrest body is in the use position, the locking tube is movable to a disengaged position in which the locking tube is disengaged from the support member to allow the headrest body and locking tube to rotate rearwardly to a release position, and wherein when the locking tube is in the disengaged position, the locking tube is also disengaged from the groove in the guide member such that the headrest body is slidable downwardly and forwardly with respect to the locking tube from the release position to the stowed position.

15. A vehicle seat assembly comprising:

a support structure;

a headrest supported by the support structure, the headrest including a headrest body that is movable with respect to the support structure between a stowed position and a use position, and a locking mechanism for locking the headrest body in the use position, wherein when the headrest body is in the use position, the locking mechanism is releasable to allow the headrest body to rotate rearwardly and slide downwardly to the stowed position; and a spring member associated with the headrest body for urging the headrest body rearwardly.

16. The vehicle seat assembly of claim 15 wherein the locking mechanism includes a locking tube that is engageable with the support structure to hold the headrest body in the use position.

17. The vehicle seat assembly of claim 16 wherein the headrest body includes a guide member having a groove, the locking tube has first and second openings for receiving the guide member such that the guide member is movable with respect to the locking tube, and the locking tube is engageable with the groove to assist in holding the headrest body in the use position.

18. The vehicle seat assembly of claim 17 wherein the locking mechanism includes a release member for disengaging the locking tube from the support structure and the groove of the guide member to allow the headrest body to rotate rearwardly from the use position to the release position and to further allow the headrest body to slide downwardly from the release position to the stowed position.

19. The vehicle seat assembly of claim 15 wherein the locking mechanism includes first and second rotatable levers that cooperate to lock the headrest body in the use position, wherein the first lever is rotatable with respect to the second lever.

20. The vehicle seat assembly of claim 19 wherein the locking mechanism further includes a release member connected to the first lever for rotating the first lever, and wherein the first lever is engageable with the second lever such that sufficient rotation of the first lever causes the second lever to rotate.

* * * * *